United States Patent
Prasad et al.

(10) Patent No.: US 9,604,565 B2
(45) Date of Patent: Mar. 28, 2017

(54) WIRELESSLY CONTROLLED HEADS-UP DISPLAY HAVING SOLAR CHARGING AND CHARGE LEVEL INDICATION

(75) Inventors: Krishnaswamy Venkatesh Prasad, Ann Arbor, MI (US); Christopher Peplin, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 152 days.

(21) Appl. No.: 13/606,123

(22) Filed: Sep. 7, 2012

(65) Prior Publication Data

US 2014/0070932 A1  Mar. 13, 2014

(51) Int. Cl.
  *G08B 21/00* (2006.01)
  *B60Q 1/00* (2006.01)
  *G02B 27/01* (2006.01)

(52) U.S. Cl.
  CPC .............. *B60Q 1/00* (2013.01); *G02B 27/01* (2013.01); *G02B 2027/014* (2013.01)

(58) Field of Classification Search
  CPC ...................................................... B60Q 1/00
  USPC ............... 340/438, 439, 441, 980; 345/7, 8; 701/400
  See application file for complete search history.

(56) References Cited

U.S. PATENT DOCUMENTS

| | | |
|---|---|---|
| 5,072,209 A | 12/1991 | Hori et al. |
| 5,414,439 A | 5/1995 | Groves et al. |
| 6,023,372 A | 2/2000 | Spitzer et al. |
| 7,089,930 B2 | 8/2006 | Adams et al. |
| 7,182,467 B2 | 2/2007 | Liu et al. |
| 7,298,557 B2 | 11/2007 | Dobschal et al. |
| 7,920,102 B2 | 4/2011 | Breed |
| 8,035,498 B2 | 10/2011 | Pennisi |
| 8,047,667 B2 | 11/2011 | Weller et al. |
| 8,055,296 B1 | 11/2011 | Persson et al. |
| 2005/0154505 A1 | 7/2005 | Nakamura et al. |
| 2006/0244421 A1 | 11/2006 | Narendran et al. |
| 2007/0112444 A1 | 5/2007 | Alberth, Jr. et al. |
| 2008/0169788 A1* | 7/2008 | Bobbin et al. ................ 320/135 |
| 2008/0249712 A1 | 10/2008 | Wang |
| 2010/0253602 A1 | 10/2010 | Szczerba et al. |
| 2010/0253918 A1 | 10/2010 | Seder et al. |
| 2011/0125397 A1 | 5/2011 | Lee |

OTHER PUBLICATIONS

GB Search Report for GB1313546.2 dated Dec. 4, 2013.

* cited by examiner

*Primary Examiner* — Jeffery Hofsass
(74) *Attorney, Agent, or Firm* — Frank A. MacKenzie; Brooks Kushman P.C.

(57) ABSTRACT

A heads up display apparatus for a vehicle, comprising a wireless transceiver configured to connect and communicate with a device providing information for display, an energy storage device configured to provide energy to the display apparatus, a processor configured receive information from the transceiver and configure the information for display, and a display configured to output the information.

8 Claims, 4 Drawing Sheets

WIRELESSLY CONTROLLED HEADS-UP DISPLAY HAVING SOLAR CHARGING AND CHARGE LEVEL INDICATION

TECHNICAL FIELD

The illustrative embodiments generally relate to a wirelessly controlled heads-up display.

BACKGROUND

Below, a few prior art heads up display systems are described. Additional usage of these systems may be obtained and described from the identified references below.

U.S. Pat. No. 5,414,439 discloses a motor vehicle that is equipped with an infrared camera for viewing roadway conditions in terms of a thermal image, and outputs a video signal to a head up display (HUD) which projects the camera view to the operator via the windshield or other combiner to display a virtual image in the operator's field of view. The HUD is configured to magnify the image to the same size as the visual or real scene, and compensates for camera and windshield distortion. The virtual image is presented above or below the real scene or may be superimposed on the real scene. A video processor allows selection of only the warmest objects for display.

United States Pub. No. 2010/0253602 discloses a substantially transparent windscreen head up display that includes one of light emitting particles or microstructures over a predefined region of the windscreen permitting luminescent display while permitting vision through the windscreen. A method to display a graphic head up instrument display upon a substantially transparent windscreen head up display of a vehicle includes monitoring operation of the vehicle, monitoring an operator-defined configuration of the graphic head up instrument display, determining the graphic head up instrument display based upon the operation of the vehicle and the operator-defined configuration of the graphic head up instrument display, and displaying the graphic head up instrument display upon the substantially transparent windscreen head up display.

United States Pub. No. 2010/0253918 discloses a method to display an infotainment graphic upon a surface within a vehicle includes monitoring a source of infotainment content. The method also includes determining the infotainment graphic based upon monitoring the source of infotainment content, and displaying the infotainment graphic upon the surface including a material reactive to display graphics in response to an excitation projector, wherein the excitation projector includes an ultraviolet projector.

SUMMARY OF THE INVENTION

A first illustrative embodiment describes a heads up display apparatus for a vehicle, comprising a wireless transceiver configured to connect and communicate with a device providing information for display, an energy storage device configured to provide energy to the display apparatus, a processor configured receive information from the transceiver and configure the information for display, and a display configured to output the information A second illustrative embodiment describes a non-transitory computer readable storage media storing instructions that, when executed by a processor associated with a heads up display (HUD), causes the processor to receive power from an energy storage device, operate an application program interface to communicate with a device, receive data from a transceiver connected to the device, configure the data into information for outputting on a display, and send instructions to the display to output the information.

A third illustrative embodiment describes a method for displaying information on a heads up display (HUD), comprising generating energy to charge an energy storage device located within the HUD, utilizing a transceiver to connect and communicate with a device, processing data request from the device, wherein the data request includes information to output on the HUD, and outputting the information on a display

DETAILED DESCRIPTION OF THE PREFERRED EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

The processes described illustratively herein can be implemented as computer code stored on a machine readable storage medium and executed by a processor. Storage medium include, but are not limited to, HDD, CDs, DVDs, RAM, ROM, flash drives, or any other suitable storage medium.

Figure 1:
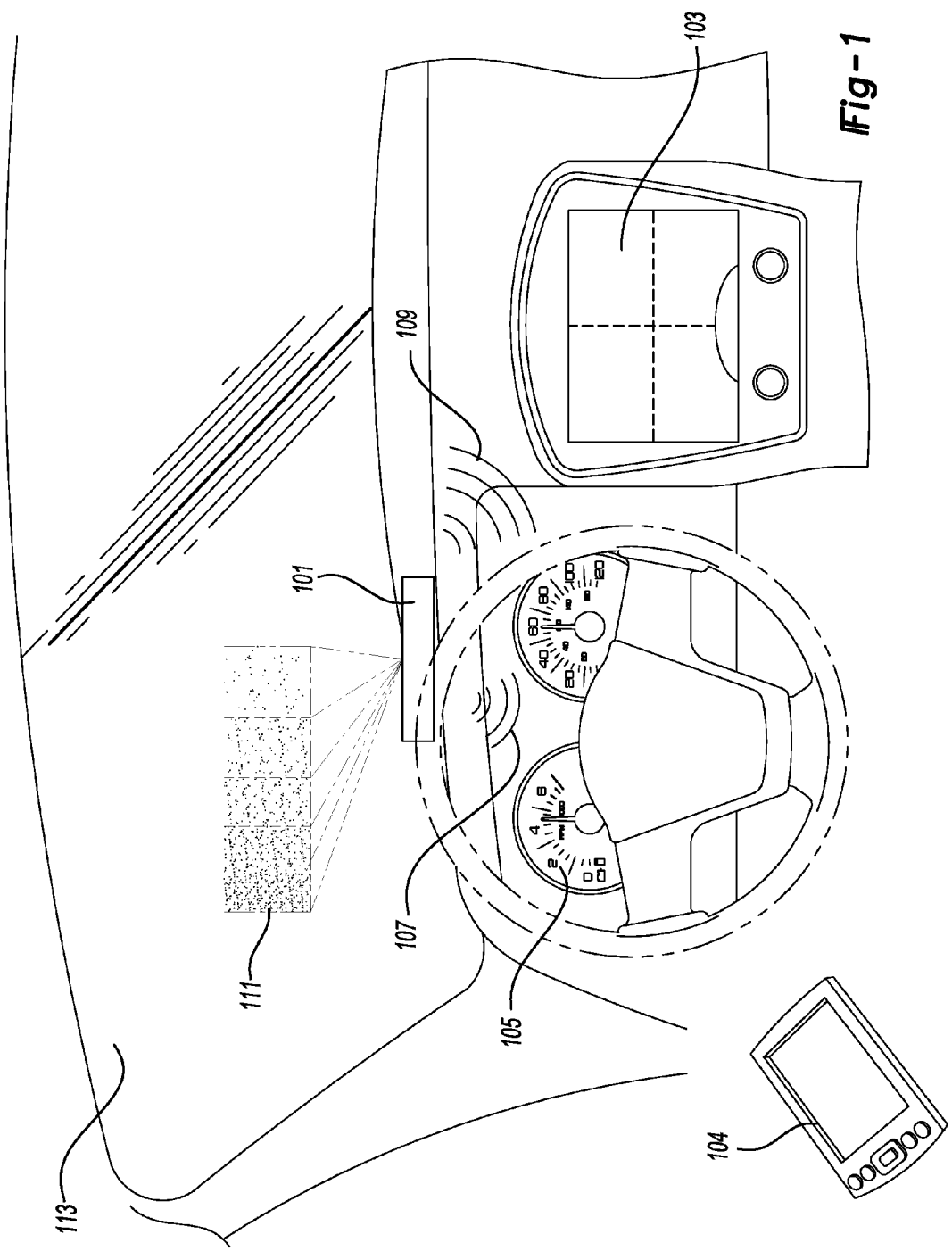
FIG. 1 shows an illustrative example of a block topology of a wireless heads-up display.

FIG. 1 illustrates an illustrative example of a block topology of a wireless heads-up display in an automobile. The heads up display (HUD) may be utilized in a car, truck, motor-home, airplane, boat, or any vehicle of the like. The HUD apparatus 101 may be wireless and move freely along the dashboard or other surface. Alternatively, the HUD may also be configured to be placed in a distinct area of a vehicle or contain adhesive material to be semi-permanently stored along a surface. The HUD may be used anywhere the display is capable of emitting output on a transparent or semi-transparent display, however, it may be beneficial to allow the HUD to be displayed in the driver's peripheral area to allow the driver to view the information output by the HUD while maintaining concentration on the road and other objects ahead of the vehicle.

The HUD 101 may communicate with a vehicle multimedia system 103, an instrument cluster 105, or any other vehicle computing system or any consumer electronic device 104. The HUD may communicate wirelessly 109 with the vehicle multimedia system 103 to exchange data and other information. The HUD may also communicate wirelessly 107 with the instrument cluster to exchange data or information with the instrument cluster. Multiple devices or systems may be in communication with the HUD to retrieve data or information for outputting to a user. The HUD or devices connected to the HUD may be in communication with off-board servers and other sources to obtain dynamic content, such as but not limited to, traffic information, weather information, vehicle information, driver information, or any other data that may be stored on an off-board server.

The HUD may also be completely self-powered by utilizing different methods of charging, such as but not limited to harvesting photonic energy, inductive charging, thermoelectric energy, a hybrid solar panel, etc. to charge a battery, or in one of many alternatives, store in a capacitor. For example, in one illustrative embodiment, the HUD may utilize a solar panel to charge a battery or capacitor to power the HUD. This may allow the HUD to be completely wireless. The placement of the HUD on a vehicle's dashboard near the windshield may allow for the HUD to be charged through solar cell technology due to the solar energy available on the dashboard. In another non-limiting example, the HUD may harvest thermal energy based on the interior temperature of the vehicle. In another alternative embodiment, the HUD may be capable of being plugged into an electrical outlet to charge, similar to consumer electronic devices like a mobile phone or MP3 player. In yet another embodiment, inductive charging may be utilized by utilizing inductive coupling through induction coils. The vehicle dashboard or alternate area may include a inductive charging pad to provide inductive charging to the HUD. It should also be noted that an alternative embodiment may include a HUD that is integrated in the vehicle dash and may be connecting to the vehicle power supply in order to run.

The HUD may display a heads-up image 111 on the windshield 113 upon receiving data and other information from the various processors in communication with the HUD. The HUD may output the display in a number of ways, such as utilizing one or two lines displays, simple led graphics, or complex images. The data, information, or images may vary dependent on the application. The HUD may also display multiple different images within a relative short period of time to depict an animation or video of the output.

The HUD allows a transparent or semi-transparent display to present data without requiring the users to look away from their typical viewpoints. In the vehicle scenario, it allows a driver to view information while being able to maintain focus on the road, rather than traditional display areas, such as the instrument cluster or center stack. Traditional areas like the instrument cluster and center stack may require a driver to move their eyes from their driving viewpoint. A HUD may typically contain a projector unit, a combiner, and a video generation computer. The HUD may include a convex lens or a concave mirror with LED/LCD at its focus. The HUD may have a processor to interface between with the HUD and the systems/data to be displayed or generated by the imagery and/or symbology to the displayed at the projection unit.

The user or driver may utilize various interfaces to change or edit settings of the HUD. In one example, the user may utilize switches on the steering wheel to change settings of the HUD or utilize controls or settings associated with the vehicle multimedia system 103. A control interface that is embedded on another device like the steering wheel switch or multimedia system may utilize a wired or wireless connection and two-way communication to edit settings and control of the HUD. The HUD's control interface may also be implemented on the HUD. The HUD may also rely on a vehicle computing system interface to change settings and interface controls on the HUD.

Figure 2:
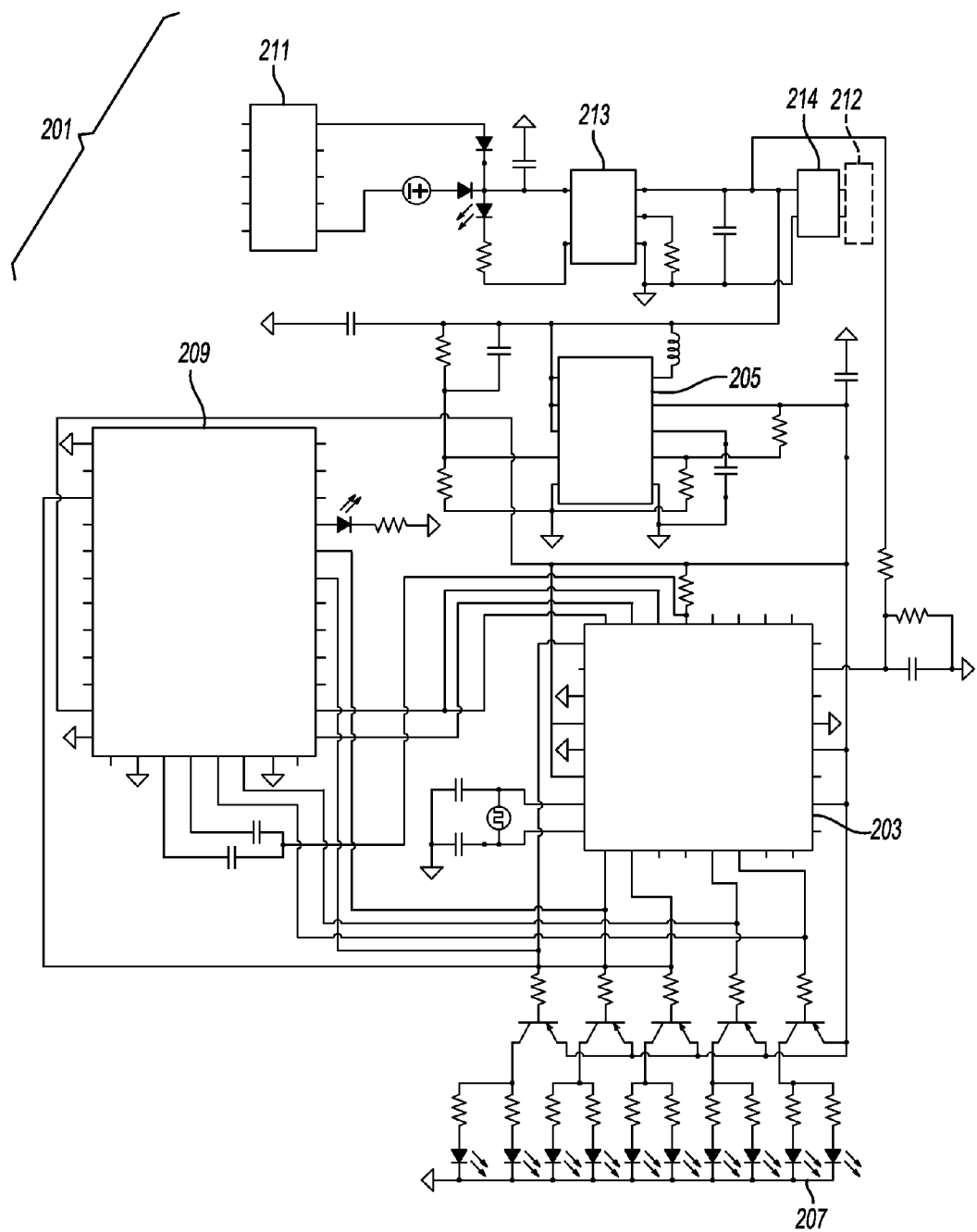
FIG. 2 shows an illustrative example of a block topology of a wireless heads-up display.

FIG. 2 illustrates an illustrative example of a block topology of a wireless heads-up display. An illustrative HUD schematic 201 may be utilized in the vehicle to output images or video of relevant data to a driver. The HUD may utilize various resistors, transistors, capacitors to work in conjunction with the processors, microcontrollers, transceivers, display, and other components utilized in the HUD. The HUD may contain a universal serial bus (USB) interface 211, to allow interoperability with outside devices, update software, send data, or to charge the HUD. In one illustrative example, a user may bring a USB flash drive into the vehicle to update firmware or software on the HUD via the USB interface 211. Furthermore, the USB interface 211 may allow for the battery or power source to be charged. Furthermore, the HUD may allow a connection of other consumer electronic devices, such as but not limited to, a cell phone, MP3 player, tablet, etc. Furthermore, the USB interface may provide a power source to the HUD.

The HUD may utilize a lithium ion or lithium ion polymer charged management controller 213 or any other type of charging module. The lithium ion polymer charged management controller allows for a rechargeable battery 212 or any other type of energy storage device 212 to charge. The energy storage device may be connected to the charging module via a pitch connector 214. The lithium ion polymer charged management controller may allow autonomous power source selection between an input or battery. The lithium ion polymer charged management controller 213 may be connected to a photovoltaic module (e.g. solar panel such as the PRT-07845) to allow charging. The HUD may also utilize a solar module power pack to connect with a solar panel and charge the battery.

The HUD may include a low input voltage synchronous boost converter 205 to utilize with a power source, such as but not limited to a single-cell, two-cell, or three-cell alkaline, NiCd or NimH, Li-Ion or Li-polymer battery. It may also be used in fuel cell or solar cell powered devices. The boost converter may allow for an output voltage to be greater than the source voltage. The boost converter may be based on a fixed frequency, pulse-width-modulation controller using synchronous rectification to obtain maximum efficiency. The converter or step-up converter 205 may utilize a "Power Save" mode to maintain a high efficiency over a wide load current range. However, "Power Save" mode may be disabled and may force the converter to operate at a fixed switching frequency. The converter may also be disabled to minimize any battery drain.

LEDs 207 may be used to display information to a driver or a user. The LEDs may receive information from the processor 203 regarding various vehicle data or information. For example, the LED may utilize images or graphics to indicate various driver information, such as turn directions, fuel economy, tire pressure, traffic, hands free phone information, caller ID, etc. The illustrative embodiment utilizes five bright LEDs, however, more or less may be used. The LEDs may be more advanced and utilize an alphanumeric or digital display that may be displayed to the driver. The LEDS may or may not utilize the traditional mirrors or lenses that a traditional HUD may utilize. For example, the HUD may utilize the windshield or any semi-transparent material to simply reflect the light emitted from the LEDs. For example, the LEDs may be arranged on top of the HUD and reflect off of a windshield back to the driver. With utilizing the reflection of the LEDs, additional flexibility of the placement and angle of the HUD may be attained. The advanced display could utilize one or two lines (or more) and still utilize a similar form factor as the illustrative embodiment FIG. 1. As an alternative, an LCD may be utilized to output images as well as video on the heads up display.

The HUD may also include a Bluetooth transceiver 209 or another wireless module to communicate with other devices. The Bluetooth transceiver 209 allows the HUD to wirelessly pair and connect with other devices to exchange data, video, audio, and other information. In one illustrative embodiment, the Bluetooth transceiver 209 may allow the HUD to communicate with a vehicle computing system to retrieve vehicle data. Although a Bluetooth transceiver is utilized in the illustrative embodiment, other wireless transceivers or receivers may be used, such as, but not limited to, Wi-Fi, RFID, infrared, etc. The vehicle data retrieved via the wireless transceiver may be processed by the processor 203 of the HUD to display onto the windshield or another substantially transparent display.

The HUD may also use an application program interface (API) or another communication protocol to communicate with the device. The HUD's API may be updated via a software or firmware upgrade utilizing the USB port or other connections, such as but not limited to, Bluetooth, WiFi, and any other wireless or wired connection. The programmable API may allow the HUD to interact with new applications or modules rather than requiring the HUD to interact with only a particular set of standard applications. In one illustrative example, the HUD may utilize OpenXC to communicate with a vehicle or another device. OpenXC may utilize an API that facilitates communication between the HUD and the VCS or other devices. The hardware module may be implemented in the HUD to allow access to the OpenXC interface. The OpenXC vehicle interface can allow the HUD to read data from the vehicle in real-time, such as steering wheel angle, GPS position, and vehicle speed.

The HUD may also utilize a standard generic API that any application or module can use. The API may depend on simply the graphical capabilities of the HUD. For example, if the HUD utilizes LEDS, the API may receive messages to either light up, hold on, or flash any specific or all LEDs. Any application or module that utilizes the API could send the commands based on various data types, such as but not limited to fuel economy, cross-traffic warnings, etc.

Figure 3:
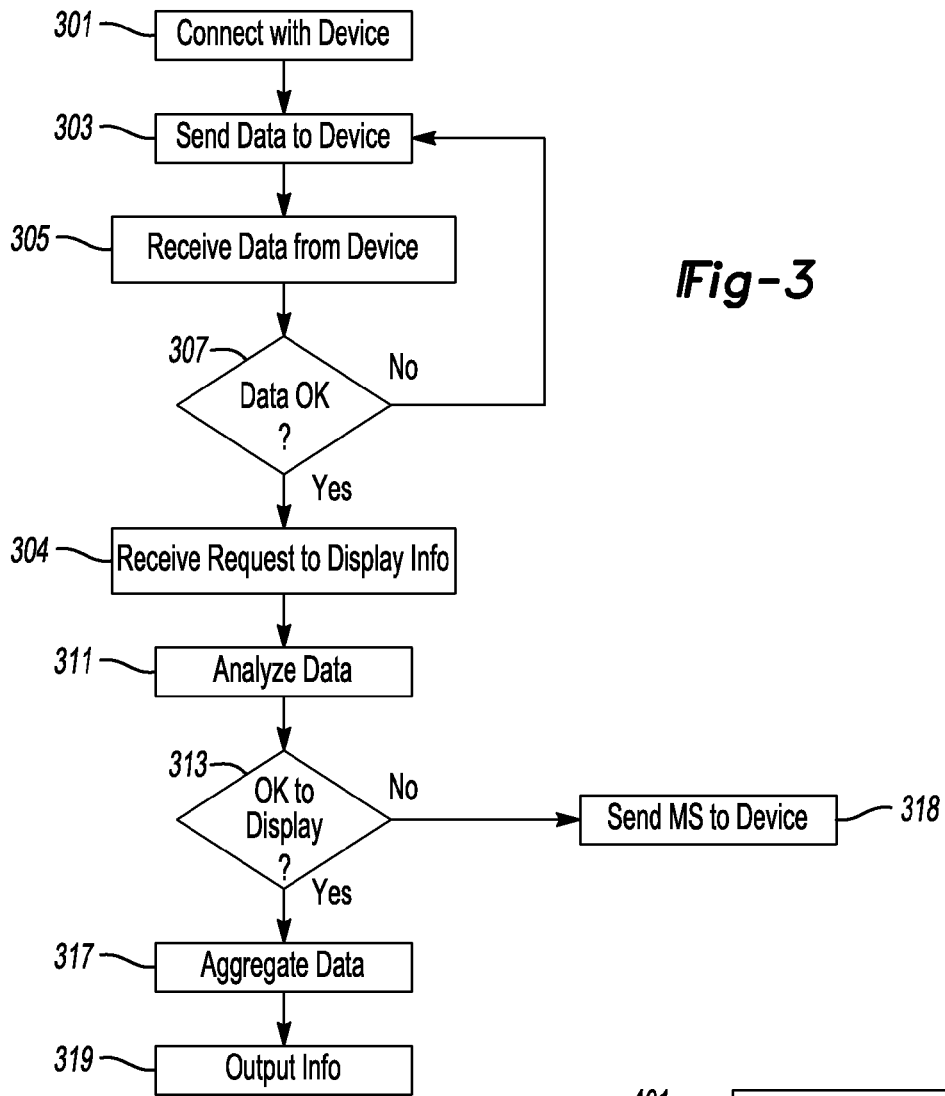
FIG. 3 depicts an illustrative flow chart of a wireless heads up display interacting with a nomadic device or vehicle computer system.

FIG. 3 depicts an illustrative flow chart of a wireless heads up display interacting with a nomadic device or vehicle computer system. The HUD may interact with a variety of nomadic devices, such as, but not limited to a cell phone, smart phone, tablet, laptop, MP3 player, portable navigation device, etc. The HUD may utilize a wireless or wired connection to connect 301 with a module or another device. The HUD may connect via a Bluetooth connection utilizing a Bluetooth receiver or another wireless connection.

The HUD may also request data 303 from the device in order to output information on the display. For example, if the HUD is currently operating to display fuel economy information, the HUD may periodically send a message to a vehicle computer system (VCS) requesting data indicating the fuel economy of the vehicle. The HUD may also send data to the VCS indicating errors, low power, or any other message. In one non-limiting example, the HUD may be below a threshold power supply, such as less than 10% of energy capacity. The HUD may send the VCS a message or data indicating that the HUD may require additional power in order to operate. The VCS may then interpret the message to display an error to the user. In another non-limiting example, the VCS may run self-diagnostic routines and identify an error with a connection or faulty module. The HUD may send the VCS a message indicating the specific error for the VCS to interpret and output to the user. The VCS may display the error on a display screen, instrument panel, or via an audible message.

Upon sending the data to the device, the HUD may receive the requested data 305. Such data may include fuel economy information, turn by turn navigation information, caller ID or other hands free information, or even images or videos to be displayed. The HUD may analyze the data to determine if the appropriate data as sent 307. In some scenarios, the HUD may never receive the requested data. The HUD may timeout based on a predetermined threshold time if no data is received by the device. In another scenario, the HUD may instead receive data with an error or corrupted data. The HUD may request the same or different data 303 if the data is not sufficient.

The HUD may also receive data or a message from the device to display certain information 309 on the HUD. For example, the VCS may receive a phone call through a Bluetooth enable mobile phone. The VCS may send a message requesting the phone number or caller ID information of the incoming call to be displayed on the HUD. The HUD is capable of two-way communication with devices; therefore, the HUD may maintain constant communication with the other devices to exchange and output data.

The HUD may analyze the request 311 to determine if it is appropriate to display the information on the HUD. In certain scenarios, the HUD may choose to ignore or reject the request to display information based on the importance of certain information already displayed on the HUD. In other scenarios, the data sent from the device may not be operable on the VCS. The VCS may send data or a message to the device 315 indicating that the message could not be displayed or interpreted. The HUD may display output based on the message indicating an error to the user.

The HUD may then aggregate all or some of the data 317 to prepare for output on the HUD's display. Aggregation of the data may include processing the data with other retrieved data to output a new data set or particular data set. The output may use various displays, such as but no limited to a alphanumeric LCD, LED, The HUD may be able to determine which output is prioritized based on the incoming data set. For example, if an emergency warning (e.g. low fuel) is sent from the VCS with a message bit indicating a high priority, the HUD may display the emergency warning indicator rather than other output such as fuel economy.

Although exemplary processes and methods are shown herein, it is understood that these are for illustrative purposes only. One of ordinary skill would understand that the steps thereof could be performed in any suitable order to produce the desired results. Further, one of ordinary skill would understand that some and/or all of the steps could be replaced by similar processes that produce similar results and/or removed if not necessary to produce the desired results in accordance with the illustrative embodiments. For example, in a non-limiting scenario, the HUD may receive data from the device 305 and simply output the information based on the data 319, eliminating any other steps disclosed in the illustrative embodiment of FIG. 3. In the alternative and contrary to the illustrative embodiment of FIG. 3, the HUD may receive a request to display info 309 from a device, prior to sending data to the device 303.

Figure 4:
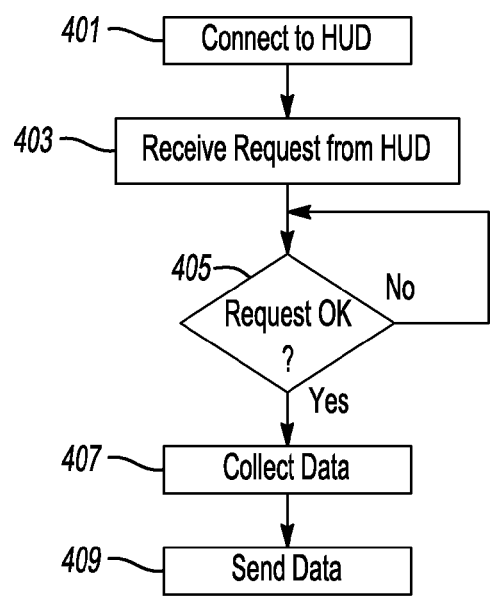
FIG. 4 depicts an illustrative flow chart of a vehicle computer system interacting with the nomadic device.

FIG. 4 depicts an illustrative flow chart of a vehicle computer system interacting with the nomadic device. The vehicle computer system (VCS) may include, but is not limited to, the vehicle multimedia system and components or devices connected to the vehicle multimedia system, navigation system, an instrument panel, engine control unit, tire pressure monitor, off-board servers, etc. The VCS may connect with the HUD 401 utilizing both a wireless or wired connection. The VCS may utilize different protocols or APIs to facilitate communication with the HUD.

The VCS may receive a request from the HUD 403 to retrieve data from the vehicle. The HUD may wish to retrieve data indicative of audio information (e.g. song, artist, track, title), fuel economy, tire pressure, navigation directions/guidance, traffic, weather, fuel, emergency warnings, etc. The VCS may also be able to retrieve data from off-board servers to output information on the HUD.

The VCS may determine if the request from the HUD is acceptable 405. In some scenarios, the HUD may send a request for data that is unavailable for retrieval from the VCS. The VCS may send an error message to the HUD indicating the type of error. Furthermore, the data request may not conform to the protocol or API utilized to facilitate communication with the HUD and VCS. The VCS may not respond to certain data requests and simply ignore the request. The HUD may be required to timeout any request that does not render a response. In some scenarios, a request that is unacceptable may require the HUD to wait and receive another request that is acceptable. The VCS may also determine that the request is acceptable and begin to process the request by initiating communication to the relevant modules.

The VCS may begin to collect relevant data 407 when the request is received and deemed acceptable. The VCS may collect all relevant data that is both on-board the vehicle and off-board the vehicle. On-board data may include auxiliary or peripheral devices that are not always connected to the VCS bus or infrastructure. The VCS may request different modules or processors to send specific data based on the request. The VCS may be capable of collecting all data to the different devices/modules or utilize different devices/modules to facilitate in collection of data.

The VCS may send data 409 to the HUD based on the request. In certain scenarios, the VCS may send all the applicable data to the HUD for the HUD to process and display. In other scenarios the VCS may send only a specific portion of the data set requested to the HUD. And in another scenario, the VCS may send an error message or some other data that was not requested to the HUD. An error message may allow the HUD to interpret the problem in the initial request.

Figure 5:
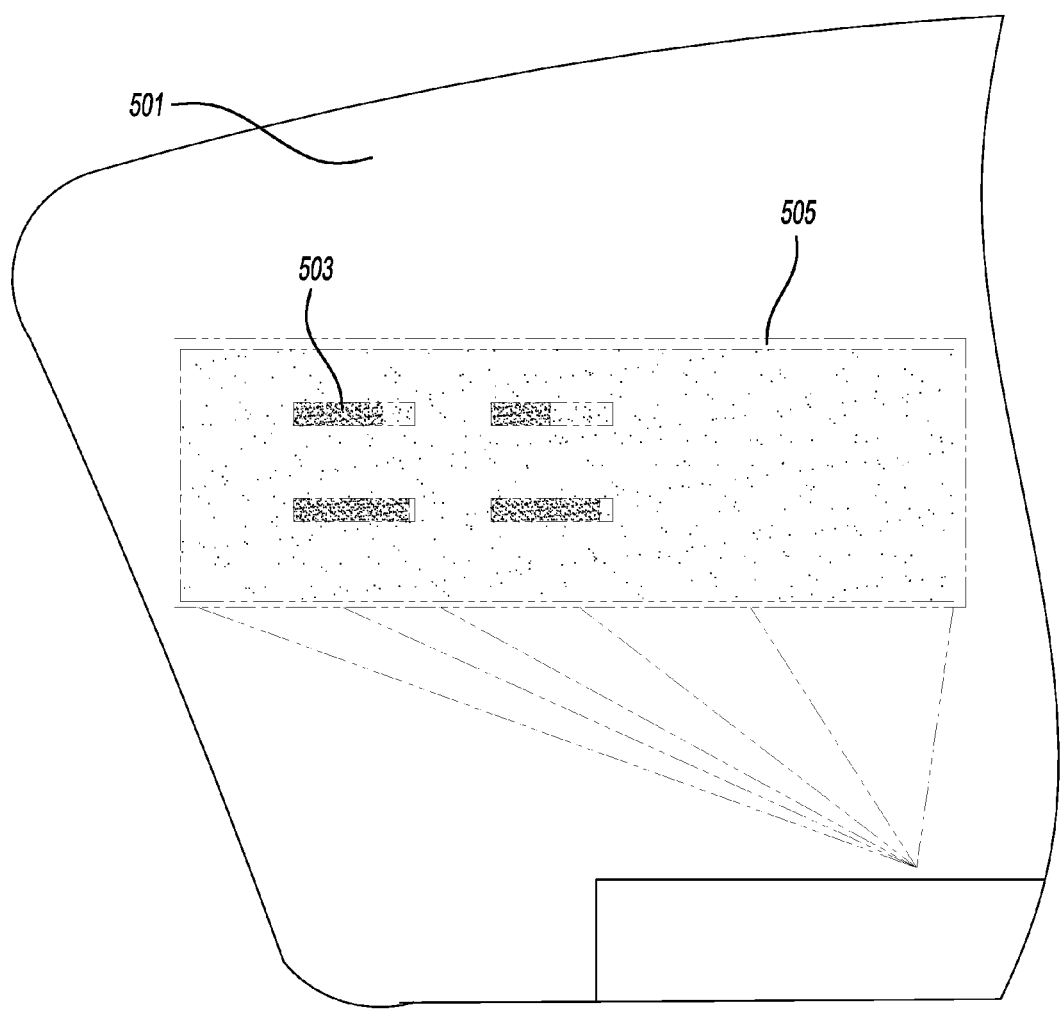
FIG. 5 depicts an illustrative example of output from the HUD that may be displayed on a semi-transparent or transparent material.

FIG. 5 depicts an illustrative example of output from the HUD that may be displayed on a semi-transparent or transparent material. The output from the HUD may be displayed on semi-transparent or transparent material 501 such as, but not limited to, the windshield or rear window. The output may be a variety of colors or schemes.

In one illustrative embodiment, the output of the HUD may utilize a border 503 to allow the driver to understand the region in which the HUD may output information on the semitransparent material. The border may also allow the driver to calibrate placement of the HUD in a region that is indicative of the driver's peripheral vision when driving.

Furthermore, the HUD may utilize the LEDs to output lines 505 to indicate different information. For example, the output may be suggestive of the driver's fuel economy. In one illustrative embodiment, the HUD may display more lines 505 to indicate the driver's fuel economy is being maximized. In another alternative embodiment, the HUD may display no lines or only a few lines 505 to indicate that the driver is driving aggressively and not optimizing the vehicle's fuel economy. As described within the specification, many alternatives exist to display different information to the driver. For example, the LEDs may be displayed in a straight line, but the LEDS may be arranged in any other pattern.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A computer-implemented method for displaying information on a heads up display (HUD), comprising:

charging with a solar panel an energy storage device located within the HUD;

utilizing a wireless transceiver to send vehicle information to a vehicle computer system (VCS) related to a charge-level status of the energy storage device; and outputting the charge-level status in a heads-up manner of a vehicle windshield, and a VCS display.

2. A computer-implemented method for displaying information on the heads up display (HUD) of claim 1, wherein the HUD includes an inductive coil.

3. A computer-implemented method for displaying information on the heads up display (HUD) of claim 1, further comprising sending a message to the vehicle computer system utilizing the wireless transceiver, the message indicating a low-energy supply of the HUD when the energy storage device is below a threshold amount of energy.

4. A computer-implemented method for displaying information on the heads up display (HUD) of claim 1, further comprising updating software of the HUD utilizing an application program interface.

5. A computer-implemented method for displaying information on the heads up display (HUD) of claim 1, wherein the VCS includes an instrument panel.

6. A computer-implemented method for displaying information on the heads up display (HUD) of claim 1, wherein the VCS includes a vehicle in communication with a nomadic device.

7. A computer-implemented method for displaying information on the heads up display (HUD) of claim 1, wherein the energy storage device is a battery, capacitor, or super capacitor.

8. A heads up display (HUD), comprising:

an energy storage device configured to power the HUD and charge using a solar panel;

a wireless transceiver configured to send vehicle information to a vehicle computer system (VCS) related to a charge-level status of the energy storage device; and a processor configured to output the charge-level status in a heads-up manner of a vehicle windshield.

* * * * *